United States Patent
Holweg et al.

(10) Patent No.: US 11,228,343 B2
(45) Date of Patent: Jan. 18, 2022

(54) CIRCUIT FOR WIRELESS DATA TRANSFER COMPRISING TEMPERATURE REGULATION

(71) Applicant: Infineon Technologies AG, Neubiberg (DE)

(72) Inventors: Gerald Holweg, Graz (AT); Carolin Kollegger, Stallhofen (AT); Johannes Schweighofer, Graz (AT); Inge Siegl, Graz (AT); Christoph Steffan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/555,853

(22) Filed: Aug. 29, 2019

(65) Prior Publication Data
US 2020/0076472 A1 Mar. 5, 2020

(30) Foreign Application Priority Data
Sep. 3, 2018 (DE) .......................... 102018121408.1

(51) Int. Cl.
| | | |
|---|---|---|
| *H04B 5/00* | (2006.01) | |
| *H04B 5/02* | (2006.01) | |
| *G06K 19/077* | (2006.01) | |
| *G06K 19/07* | (2006.01) | |
| *G06K 7/10* | (2006.01) | |

(52) U.S. Cl.
CPC ....... *H04B 5/0031* (2013.01); *G06K 7/10237* (2013.01); *G06K 19/0716* (2013.01); *G06K 19/0726* (2013.01); *G06K 19/0773* (2013.01); *G06K 19/07749* (2013.01); *H04B 5/0062* (2013.01); *H04B 5/02* (2013.01)

(58) Field of Classification Search
CPC ...... H04B 5/0031; H04B 5/0062; H04B 5/02; H04B 5/0081; G06K 19/0773; G06K 19/07749; G06K 19/0716; G06K 19/0726; G06K 7/10237; G06K 19/0717; G06K 19/07745
See application file for complete search history.

(56) References Cited

U.S. PATENT DOCUMENTS

| | | | | |
|---|---|---|---|---|
| 9,024,727 B1 * | 5/2015 | Otis | ........................ | H01H 3/166 340/10.1 |
| 2014/0035521 A1 * | 2/2014 | Endo | .................... | H04B 1/3883 320/108 |
| 2014/0252878 A1 * | 9/2014 | Jantunen | .............. | H04B 5/0081 307/104 |

FOREIGN PATENT DOCUMENTS

| | | |
|---|---|---|
| DE | 198 12 728 A1 | 9/1999 |
| DE | 10 2009 019 884 A1 | 4/2010 |

(Continued)

OTHER PUBLICATIONS

Office Action, EP 10 2018 121 408.1, dated Jul. 6, 2019, pp. 8.

*Primary Examiner* — Yuwen Pan
*Assistant Examiner* — Fatuma G Sherif
(74) *Attorney, Agent, or Firm* — Armis IP Law, LLC (57) ABSTRACT

A circuit for an NFC chip is described herein. According to one exemplary configuration, the circuit comprises an antenna for near field communication, an antenna resonant circuit which has an adjustable resonant frequency, a temperature sensor and a controller circuit coupled to the temperature sensor. The controller circuit is designed to change the resonant frequency of the antenna resonant circuit according to a temperature sensor signal provided by the temperature sensor.

26 Claims, 5 Drawing Sheets

(56) References Cited

FOREIGN PATENT DOCUMENTS

JP           2002109495 A  *  4/2002
WO    WO 2003/081802 A1   10/2003

* cited by examiner

CIRCUIT FOR WIRELESS DATA TRANSFER COMPRISING TEMPERATURE REGULATION

TECHNICAL FIELD

The present description relates to the field of electronic components for wireless data transfer such as NFC reader/writer devices, RFIDs and the like.

BACKGROUND

Near field communication (NFC) is an international transmission standard based on RFID technology for contactless data-exchange by means of electromagnetically coupled coils over relatively short distances (e.g. a few centimeters) and a data transfer rate of currently 424 kbit/s maximum. This technology has been used until now primarily in the "micropayment" field (cashless payments involving small sums) and in access control. Examples of other uses are the transfer of authentication data for establishing communication via a Bluetooth or WLAN connection, for instance, and opening weblinks when a URL (Uniform Resource Locator) of a website is stored in an NFC chip. NFC is standardized in ISO/IEC 18092 (Near Field Communication Interface and Protocol-1) and ISO/IEC 21481 (Near Field Communication Interface and Protocol-2).

With regard to the payment function mentioned, many modern mobile devices such as smartphones are equipped with an NFC reader/writer. Such devices are known as NFC-enabled mobile devices. An NFC chip, often also called an NFC tag or NFC transponder, usually does not have its own energy supply and is supplied with energy from the electromagnetic field generated by an NFC-enabled mobile device. In other words, energy is transferred from the NFC-enabled mobile device to the NFC chip, whereas data transfer is possible in both directions. Currently available NFC-enabled devices usually work at a fixed transmit power and do not allow any power regulation. The set transmit power can vary markedly depending on the type and manufacturer of the NFC-enabled device. For example, there are NFC-enabled smartphones that work with about ten times the NFC transmit power of other smartphones.

The antennas of NFC-enabled devices and NFC chips (NFC transponders) are, strictly speaking, simple conductor loops. In the various antenna circuits, these conductor loops constitute an inductance, which together with corresponding capacitances form parallel resonant circuits. For efficient energy transfer from an NFC-enabled device to an NFC chip, the antenna circuits are usually operated at the same resonant frequency, thereby maximizing the inductive coupling and the induced voltage. In standard applications, this resonant frequency is typically 13.56 MHz.

When there is good inductive coupling of the antenna of an NFC chip to the antenna of an NFC-enabled device (for instance when the NFC chip is situated very close to the mobile device), situations can arise in which more energy is transferred to the NFC chip than is needed in the NFC chip. In such situations, the excess energy must be dissipated in the NFC chip, for instance in shunt transistors. The dissipation of the excess energy can result in relatively high temperatures in an NFC chip.

BRIEF DESCRIPTION

A circuit for an NFC chip is described below. According to one exemplary embodiment, the circuit comprises an antenna for near field communication, an antenna resonant circuit which has an adjustable resonant frequency, a temperature sensor and a controller circuit coupled to the temperature sensor. The controller circuit is designed to change the resonant frequency of the antenna resonant circuit according to a temperature sensor signal provided by the temperature sensor.

In accordance with further embodiments, the antenna resonant circuit (R) comprises an adjustable capacitance, and wherein the controller circuit is operative to change the adjustable capacitance for the purpose of changing the resonant frequency.

In yet further embodiments, the circuit further includes: an RF front end, which is coupled to the antenna and is operative to generate a supply voltage on the basis of an RF signal received by the antenna.

In still further embodiments, the RF front end (11) includes a reader/writer for near field communication.

In further example embodiments, the circuit includes sensor electronics for acquiring and processing one or more sensor signals. A controller coupled to the sensor electronics is operative to transfer, via the RF front end and the antenna, the processed sensor signals, or information dependent thereon, to an external device.

According to another exemplary embodiment, the circuit comprises an antenna for near field communication (NFC), which is designed to receive an RF signal from an external NFC-enabled device. The circuit also comprises an RF front end connected to the antenna and having an NFC reader/writer, and comprises a temperature sensor, which provides a temperature sensor signal. Coupled to the temperature sensor is a controller, which is designed to transmit data to the NFC-enabled device using the NFC reader/writer and on the basis of the temperature sensor signal, which data causes the NFC-enabled device to change the power of the RF signal. In accordance with further embodiments, the controller is operative to send, depending on the temperature sensor signal, using the NFC reader/writer, a request to the NFC-enabled device to adjust the power of the RF signal.

In addition, a method for stabilizing the temperature in an NFC chip is described. According to one exemplary embodiment, the method comprises measuring a temperature of a chip (circuit) by means of a temperature sensor, and varying a resonant frequency of an antenna resonant circuit comprising an antenna that is coupled to an NFC reader/writer arranged in the NFC chip. In accordance with further embodiments, the method includes adjusting a capacitance of a capacitor in the antenna resonant circuit to change the resonant frequency.

According to one exemplary embodiment, the method comprises receiving an RF signal by means of a reader/writer for near field communication, measuring a chip temperature by means of a temperature sensor, transferring data on the basis of the temperature signal to an NFC-enabled device, and the NFC-enabled device changing the power of the RF signal in response to the transferred data.

SHORT DESCRIPTION OF THE DRAWINGS

Various exemplary embodiments are explained in greater detail below with reference to figures. The diagrams are not necessarily to scale and the exemplary embodiments are not limited just to the aspects shown. The aim is rather to illustrate the principles behind the exemplary embodiments. In the figures.

DETAILED DESCRIPTION

Figure 1:
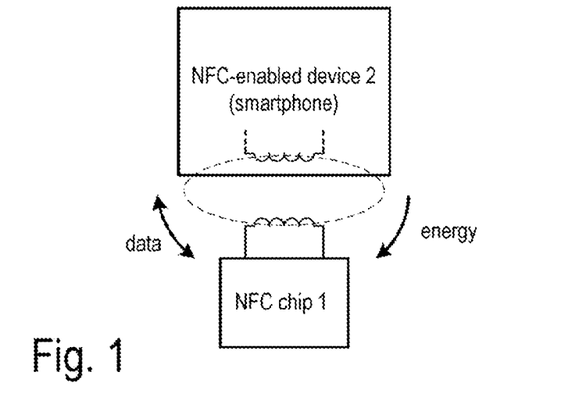
FIG. 1 is an example diagram illustrating the coupling of an NFC chip to an NFC-enabled device such as a smartphone or the like according to embodiments herein.

As mentioned in the introduction, near field communication (NFC) is a standard for transferring energy and data between an NFC-enabled device 2 such as a tablet computer or a smartphone, for instance, and an NFC chip 1. This situation is shown in FIG. 1. Usually NFC is used not just for (bidirectional) data transfer but also for the (unidirectional) supply of energy to the NFC chip 1 by the NFC-enabled device 2. The antennas of NFC chip 1 and of the NFC-enabled device 2 are usually embodied as conductor loops (i.e. flat coils), and the transfer of data and energy is based on inductive coupling of the two antennas.

Figure 2:
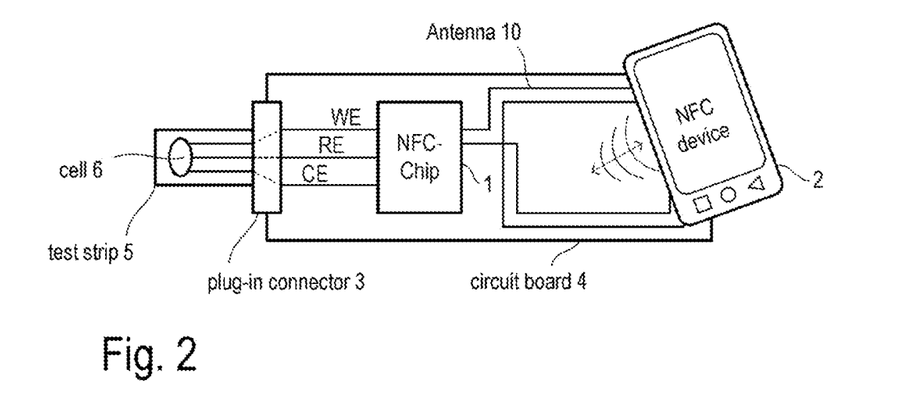
FIG. 2 is an example diagram illustrating a measurement arrangement comprising an electrochemical converter element, an NFC chip and an NFC-enabled device according to embodiments herein.

NFC chips can be employed in various applications. NFC is mainly used for authentication, for example in association with payment systems (e.g. micropayment) or systems for access control. A relatively new use is coupling sensors to an NFC-enabled mobile device such as a smartphone, for instance, by means of near field communication. In this case, the sensor electronics comprises an RFID front end (radiofrequency (RF) front end circuit) for near field communication with the mobile device. The mobile device can be used, for instance in a measurement application, for further processing of measurement data transferred by means of NFC from the sensor electronics to the mobile device, and to display this measurement data on a screen of the mobile device. In addition, the mobile device can receive user inputs and transfer these user inputs by means of NFC to the sensor electronics. The mobile device can thereby act as a human-machine interface for the sensor electronics. FIG. 2 shows an example of an apparatus comprising a sensor coupled to a mobile device by means of NFC.

FIG. 2 illustrates an example of an apparatus comprising a biochemical sensor and comprising integrated sensor electronics that include an interface for near field communication (NFC) in order to be able to transfer measurement data to an NFC-enabled mobile device 2. In the example shown in FIG. 2, the NFC chip 1 includes said sensor electronics and the NFC interface. The energy can be supplied to the NFC chip also by means of NFC. The sensor apparatus shown in FIG. 2 comprises a circuit board 4, on which are arranged the NFC chip 1 and an antenna 10. As mentioned, the antenna 10 can essentially be a conductor loop (i.e. a flat coil) formed by strip conductors on the circuit board. As shown in FIG. 2, arranged on the circuit board 4 is a plug-in connector 3, by means of which an electrochemical cell 6 arranged on a test strip 5 can be connected to the circuit board. The electrodes of the electrochemical cell 6, which are labeled WE, RE and CE in FIG. 2, are connected to the NFC chip 1 via the plug-in connector 3 and strip lines arranged on the circuit board. As mentioned, the NFC chip 1 contains the sensor electronics for acquiring and processing the sensor signals and the circuits needed for near field communication. The electrochemical cell 6 can be used, for example, for voltammetry or similar techniques in order to determine quantitatively one or more substances (analytes) present in the electrolyte of the electrochemical cell. The sensor electronics contained in the NFC chip 1 provide the drive for the electrodes WE, RE and CE that is needed for this purpose. It is possible to dispense with the test strip 5 and the plug-in connector 3 if the electrochemical cell 6 is arranged directly on the circuit board 4.

Sensor apparatuses such as the example shown in FIG. 2 are known per se, for instance for measuring the potassium concentration in the blood (see e.g. Kollegger, C., Greiner, P., Siegl, I. et al., Intelligent NFC potassium measurement strip with hemolysis check in capillary blood, in: Elektrotech. Inftech. (2018) 135/1, S. 83-88, https://doi.org/10.1007/s00502-017-0572-5). In this case, a drop of blood forms the electrolyte of the electrochemical cell, which is operated as a potentiostat in order to determine the concentration of potassium in the blood. A potentiostat can be used, for instance, for cyclic voltammetry (CV), which is a means of determining the chemical composition of substance mixtures on the basis of the voltage-dependent current variation in the electrochemical cell. Voltammetry is a form of electrolysis in which the dependency of an electrode current on a voltage applied to an electrochemical cell is ascertained. The further examination of the sample includes analyzing the measured current/voltage curves, for instance to ascertain the concentration of an analyte (e.g. specific metal ions) present in the sample. The mobile device 2 can perform, at least in part, this analysis and the display of the measurement results. In particular, the CPU (not shown) contained in the mobile device can be used to execute software applications that are designed to perform the stated analysis of the (digitized) measurement data and to display the results.

As mentioned, the NFC chip 1 can also be supplied with energy by means of NFC. Latest NFC-enabled devices, however, do not allow any control of the transferred power (energy per unit of time), and the NFC interfaces at both ends (NFC-enabled device 2, NFC chip 1) are usually designed to achieve optimum inductive coupling. The power that is not needed by the NFC chip 1 is dissipated in the form of heat, for instance in an electrical resistor, which in the NFC chip 1 results in a temperature rise. In many uses, a raised temperature is of no further relevance, but in sensor applications, temperature fluctuations have a negative impact on the accuracy of the measurement. The following exemplary embodiments provide a solution for regulating or stabilizing (within certain limits) the temperature in the NFC chip.

Figure 3:
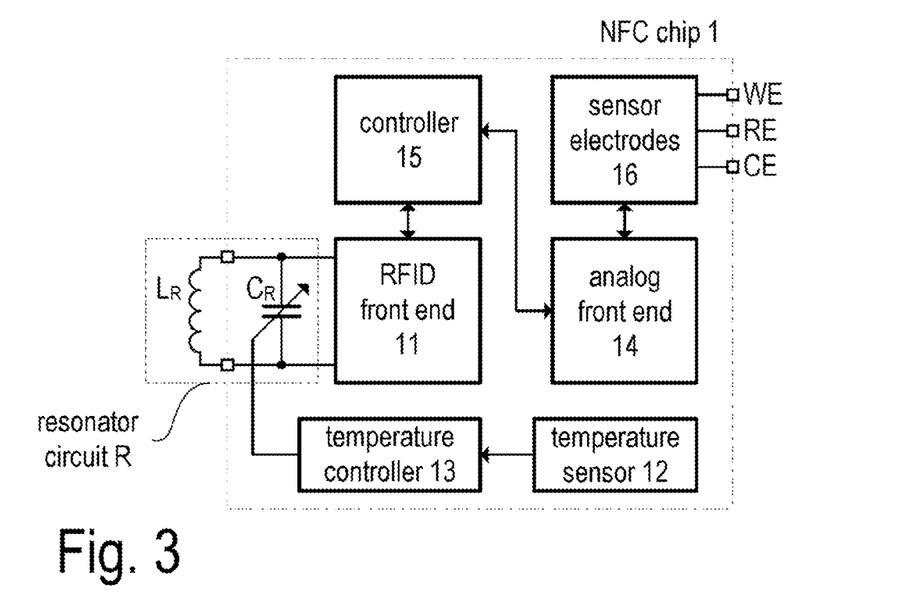
FIG. 3 is an example diagram illustrating an exemplary embodiment of an NFC chip comprising an RF front end for near field communication and an analog front end for processing sensor signals according to embodiments herein.

FIG. 3 illustrates an exemplary embodiment of an NFC chip 1 comprising an RF front end 11 for near field communication, a digital controller 15 (e.g. a microcontroller), an interface circuit 16 for the sensor electrodes WE, RE, CE, and an analog front end 14 for analog processing of the sensor signals. The interface circuit 16 can include amplifiers, for example, that provide the cell voltage. The analog front end 14 can include, inter alia, one or more signal sources, which are used for driving the electrochemical cell, and an analog-to-digital converter for digitizing the sensor signals. The digitized signals can undergo further digital processing by the controller 15 and be transferred in the form of a serial data stream wirelessly by means of NFC to the mobile device 2. This data transfer is facilitated by the RFID front end, which includes all the radiofrequency circuit components used for the data transfer. The NFC chip 1 can comprise one or more controllable capacitors $C_R$, which form with the antenna (represented in FIG. 3 as the inductance $L_R$) connected to the NFC chip a resonator circuit (antenna resonant circuit R) that has a specific resonant frequency $f_R$. The design and operation of RFID front end 11, controller 15, analog front end 14 and interface circuit 16 are known per se and therefore are not described further here. In particular, the RF front end 11 comprises an NFC reader/writer and a rectifier circuit, which is designed to generate on the basis of the received RF signal (carrier signal), a supply voltage for the circuit components contained in the NFC chip 1.

Even though not shown explicitly in FIG. 3, the RFID front end 11 also provides the supply voltage for the remaining components of the NFC chip 1. The energy for generating the supply voltage is received from the NFC-enabled mobile device 2 (not shown in FIG. 3) via the antenna $L_R$. In order to ensure optimum transfer of data and energy, the resonant frequency $f_R$ can be set to equal the carrier frequency used by the NFC-enabled mobile device 2. As mentioned, a carrier frequency of 13.56 MHz is often used.

A explained above, the temperature in the NFC chip 1 can rise if too much power is transferred to the RFID front end 11 via the NFC transmission channel. In order to counteract this temperature rise, the NFC chip 1 can comprise a temperature sensor 12, which provides a temperature measurement signal, which is input to a controller circuit 13. This controller circuit 13 is designed to change the resonant frequency $f_R$ of the antenna resonant circuit R so that the resonant frequency $f_R$ is no longer matched to the carrier frequency used for the near field communication (NFC). The result of said detuning of the resonant frequency $f_R$ is that the power received by the RFID front end 11 falls, and hence less power has to be dissipated, and the temperature in the NFC chip can fall again. The detuning of the resonant frequency $f_R$ of the antenna resonant circuit R can be achieved, for example, by changing the capacitance of the capacitor $C_R$. For this purpose, the capacitor can be designed, for example, as a digitally tunable capacitor (DTC) or as a varactor.

Figure 4:
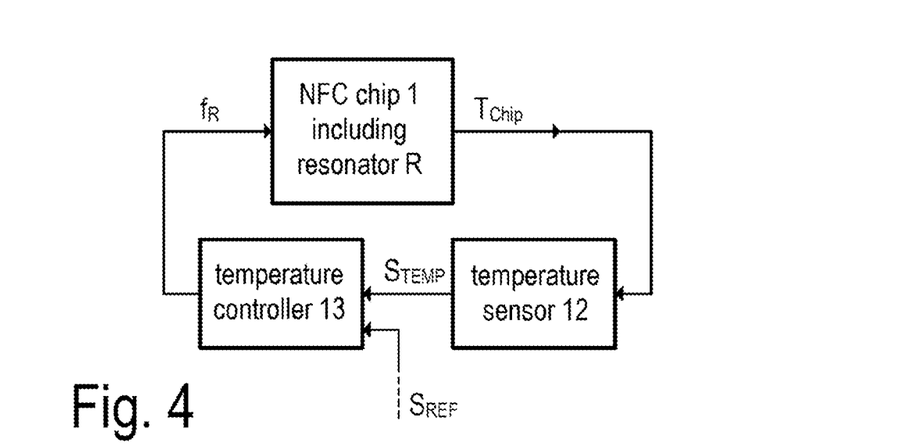
FIG. 4 is an example diagram illustrating a control loop used in the example of FIG. 3 for regulating or stabilizing the temperature of the NFC chip according to embodiments herein.

The temperature controller 13 facilitates a closed control loop, which is shown schematically in FIG. 4. As explained, the temperature $T_{Chip}$ in the NFC chip 1 depends on the power $P_R$ received by the antenna, which in turn depends on the resonant frequency $f_R$ of the antenna resonant circuit R. For the purpose of temperature regulation, the NFC chip can thus be considered to be a system whose input variable is the resonant frequency $f_R$ and whose output variable is the temperature $T_{Chip}$. This temperature $T_{Chip}$ is measured by the temperature sensor 12, which provides a temperature signal $S_{TEMP}$ representing the temperature $T_{Chip}$. This temperature signal $S_{TEMP}$ is input to the controller circuit 13, which is designed to adjust the resonant frequency $f_R$ according to the temperature signal $S_{TEMP}$ (and optionally also according to a reference signal $S_{REF}$).

Figure 5:
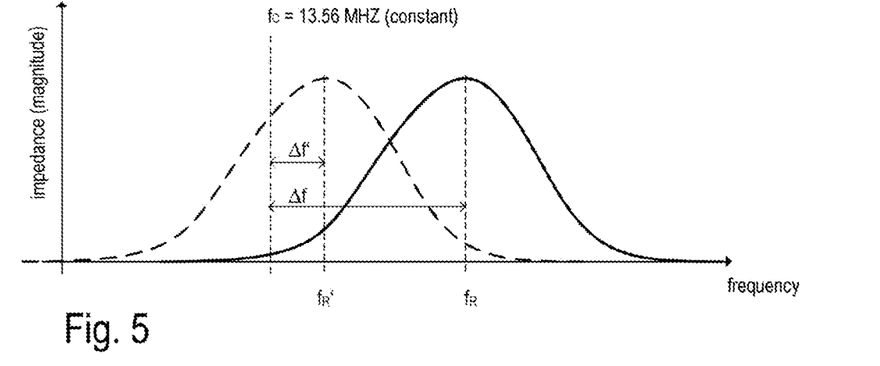
FIG. 5 is an example diagram illustrating a graph by way of example, the shift in the resonance peak of the antenna resonant circuit of the NFC chip according to embodiments herein.
Figure 6:
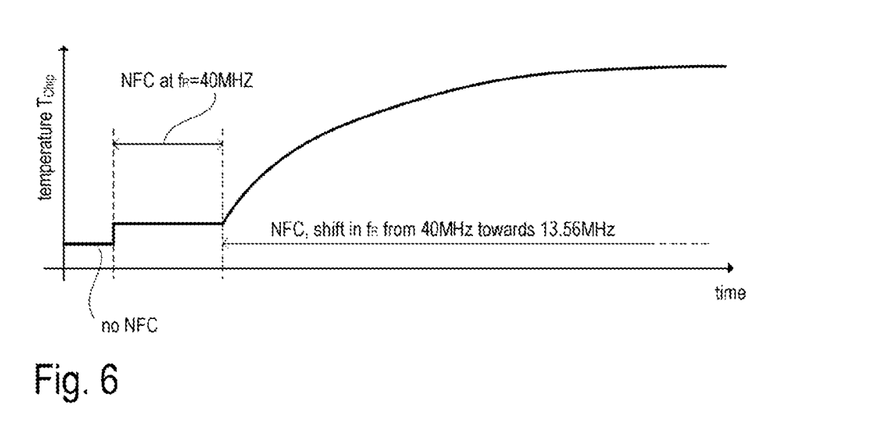
FIG. 6 is an example diagram illustrating a graph by way of example, the change in the chip temperature as a function of the resonant frequency of the antenna resonant circuit according to embodiments herein.

For example, the resonant frequency $f_R$ can be adapted according to the difference $S_{TEMP}-S_{REF}$ (difference between measured temperature and reference temperature). If the level of the temperature signal $S_{TEMP}$ is higher than the (e.g. constant) level of the reference signal $S_{REF}$, then the resonant frequency $f_R$ can be increased until the (constant) carrier frequency $f_C$ used by the NFC-enabled device 2 (e.g. $f_C$=13.56 MHz) lies no longer within (or at the edge of) the resonance peak of the antenna resonant circuit R. If the level of the temperature signal $S_{TEMP}$ is lower than the level of the reference signal $S_{REF}$, then the resonant frequency $f_R$ can be shifted towards the carrier frequency used by the NFC-enabled device 2 so that the carrier frequency lies in the central region of the resonance peak. FIG. 5 shows the shift in the resonant frequency $f_R$ and thus in the resonance peak of the antenna resonant circuit R. The continuous line represents the resonance peak of the antenna resonant circuit R for a resonant frequency of e.g. 40 MHz. In this case, the difference $\Delta f$ with respect to the carrier frequency $f_C$ is approximately $\Delta f=f_R-f_C=26.44$ MHz and the carrier frequency $f_C$ lies at the edge of the resonance peak. The dashed line represents the resonance peak of the antenna resonant circuit R for a resonant frequency $f_R$ that is significantly less than 40 MHz (e.g. 19 MHz). In this case, the carrier frequency $f_C$ lies in the central region of the resonance peak. Given perfect matching of the antenna resonant circuit R, the resonant frequency $f_R$ would equal the carrier frequency $f_C$. FIG. 6 shows in a schematic diagram the increase in the chip temperature $T_{Chip}$ while near field communication (NFC) is active and the resonant frequency is gradually shifted, for instance starting from 40 MHz, towards the carrier frequency $f_C$. It is evident that the smaller the difference $\Delta f$, the higher the temperature, with the temperature no longer rising for a certain difference $\Delta f$ onwards.

Figure 7:
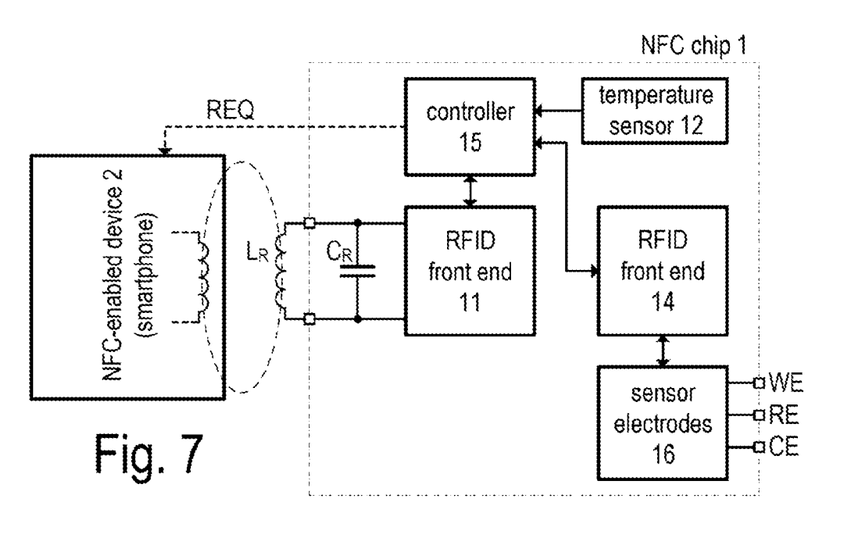
FIG. 7 is an example diagram illustrating another exemplary embodiment of an NFC chip comprising an RF front end for near field communication and an analog front end for processing sensor signals according to embodiments herein.

FIG. 7 illustrates an alternative exemplary embodiment in which the temperature information measured in the NFC chip 1 is transferred to the NFC-enabled mobile device 2. The NFC-enabled mobile device 2 then has the facility to reduce the transmit power, whereby the power received by the NFC chip 1 is likewise reduced without the need to change the resonant frequency $f_R$ of the antenna resonant circuit. In the example of FIG. 7, the RFID front end 11, the controller 15, the analog front end 14 and the interface circuit 16 are essentially the same as in the previous example from FIG. 3. Unlike the previous example, however, the temperature information acquired by the temperature sensor 12 is digitized and input to the controller 15. The controller 15 or the temperature sensor 12 can comprise for this purpose an analog-to-digital converter (not shown in FIG. 7). The controller 15 is designed to send to the NFC-enabled mobile device 2, depending on the temperature measured in the NFC chip 1, a request to change the transmit power. If, for example, the measured temperature exceeds a reference value, then the controller 15, by transferring a suitable request REQ by means of NFC to the NFC-enabled mobile device 2, causes this device to reduce the transmit power.

This reduction in the transmit power can be performed continuously or incrementally, depending on how the NFC-enabled device 2 is implemented. A temperature control loop is thereby formed that also contains the NFC-enabled mobile device 2. The NFC-enabled mobile device 2, however, must support the adaptation of the transmit power, and although this is not the case for many devices currently on the market, this may be the case in future.

Figure 8:
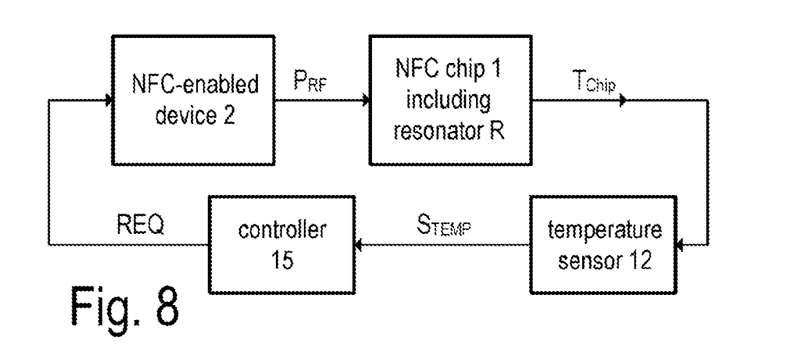
FIG. 8 is an example diagram illustrating the control loop used in the example of FIG. 5 for regulating or stabilizing the temperature of the NFC chip according to embodiments herein.

FIG. 8 illustrates schematically the control loop realized in the exemplary embodiment shown in FIG. 7. As explained, the temperature $T_{Chip}$ in the NFC chip 1 depends on the power $P_{RF}$ received by the antenna. For the purpose of temperature regulation, the NFC chip can thus be considered in the present example to be a system whose input variable is the power $P_{RF}$ received in the near field communication (NFC) and whose output variable is the temperature $T_{Chip}$. This temperature $T_{Chip}$ is measured by the temperature sensor 12, which provides a temperature signal $S_{TEMP}$ representing the temperature $T_{Chip}$. This temperature signal $S_{TEMP}$ is input to the controller 15, which is designed to call on the NFC-enabled device 2 via the NFC transmission channel to adapt the transmit power. This adaptation can depend on the measured temperature $T_{Chip}$ and, if applicable, on a reference value. Depending on the capabilities of the NFC-enabled device 2, this device can also poll the controller 15 regularly for the measured temperature (temperature signal $S_{TEMP}$) via the NFC transmission channel, and adapt the transmit power according to the temperature.

Figure 9:
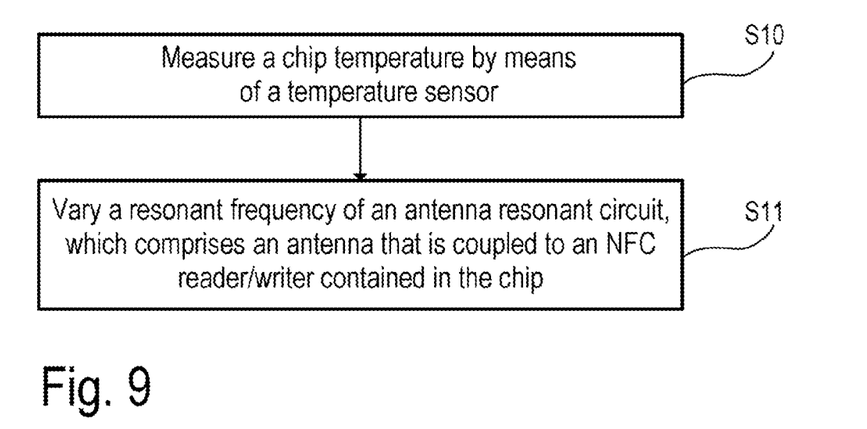
FIG. 9 is an example diagram illustrating illustrating an example of a method for stabilizing the temperature of an NFC chip according to embodiments herein.

The methods for regulating/stabilizing the temperature in an NFC chip, which are implemented by the exemplary embodiments described above, are summarized below. FIG. 9 illustrates in a flow chart an example of a method that can be implemented, for instance, using the circuit of FIG. 3. According to FIG. 9, the method comprises measuring a chip temperature by means of a temperature sensor (see FIG. 9, step S10) and varying a resonant frequency of an antenna resonant circuit (see FIG. 9, step S11), which comprises an antenna that is coupled to an NFC reader/writer arranged in the NFC chip. In one exemplary embodiment, the resonant frequency is varied by varying the capacitance of a capacitor contained in the antenna resonant circuit. As explained above, detuning the antenna resonant circuit results in a reduction in the power received by the antenna and hence results in less power to be dissipated in the NFC chip, which in turn leads to a reduction in the temperature.

Figure 10:
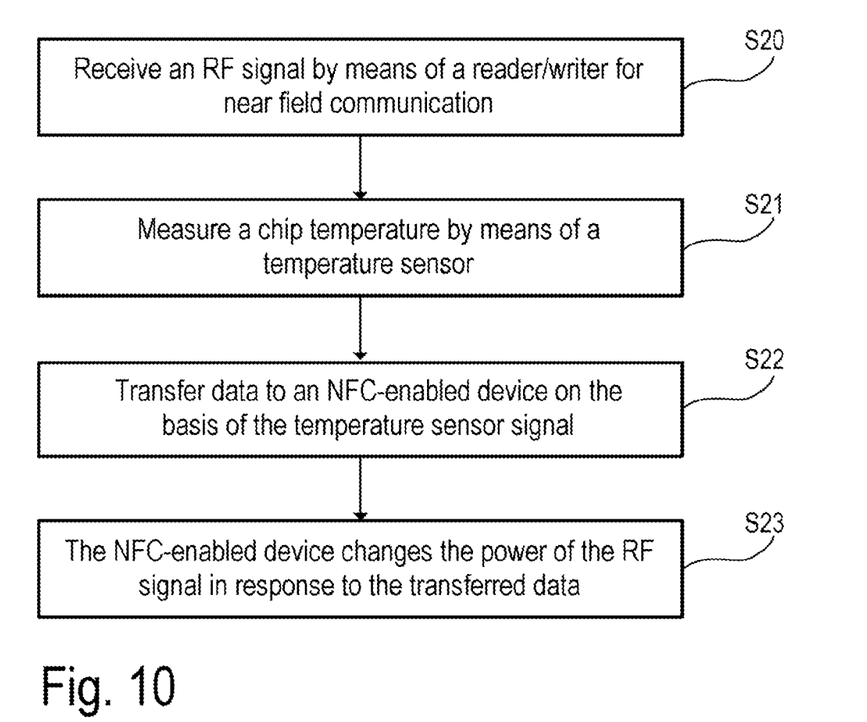
FIG. 10 is a flow diagram for illustrating another example of a method for stabilizing the temperature of an NFC chip according to embodiments herein.

FIG. 10 is a flow chart for illustrating another example, in which an NFC-enabled device (e.g. a smartphone) is part of the temperature control loop. According to FIG. 10, the method comprises receiving an RF signal by means of a reader/writer for near field communication (see FIG. 10, step S20), measuring a chip temperature by means of a temperature sensor (see FIG. 10, step S21), transferring data to the NFC-enabled device on the basis of the temperature sensor signal (see FIG. 10, step S22). The NFC-enabled device changes the power of the RF signal in response to the transferred data (see FIG. 10, step S23). This method can be realized, for example, using the system shown in FIG. 7 (NFC-enabled device 2, NFC chip 1).

The invention claimed is:

1. A circuit comprising:
   an antenna supporting near field communications with an NFC-enabled device;
   an antenna resonant circuit, a resonant frequency of the antenna resonant circuit depending on an inductance of the antenna;
   a temperature sensor;
   a controller circuit coupled to the temperature sensor, the controller circuit operative to change the resonant frequency of the antenna resonant circuit based on a temperature sensor signal produced by the temperature sensor; and
   wherein the controller circuit is operative to change the resonant frequency to be different than a carrier frequency used by the NFC-enabled device to communicate with the antenna; and
   wherein the controller circuit is operative to calculate a difference between a temperature as indicated by the temperature sensor signal and a reference temperature value;
   wherein the controller circuit is operative to increase a magnitude of the resonant frequency in response to detecting that the temperature is greater than the reference temperature value, the controller circuit operative to increase the resonant frequency until the carrier frequency used by the NFC-enabled device no longer lies within a resonance peak of the antenna resonant circuit.

2. The circuit as in claim 1, wherein the antenna resonant circuit comprises an adjustable capacitance, and wherein the controller circuit is operative to change the adjustable capacitance to change the resonant frequency.

3. The circuit as in claim 2 further comprising:
   an RF front end, which is coupled to the antenna and is operative to generate a supply voltage based on an RF signal received by the antenna from the NFC-enabled device.

4. The circuit as in claim 3, wherein the RF front end includes a reader/writer for processing data in the near field communications.

5. The circuit as in claim 1 further comprising:
   sensor electronics for acquiring and processing sensor signals.

6. The circuit as claimed in claim 5, wherein the controller circuit is coupled to the sensor electronics, the controller circuit operative to transfer, via an RF front end and the antenna, the processed sensor signals to the NFC-enabled device.

7. The circuit as in claim 1, wherein the temperature sensor is operative to monitor a temperature of a chip including at least a portion of the antenna resonant circuit, the temperature sensor signal indicating the temperature of the chip.

8. The circuit as in claim 7, wherein the controller circuit is operative to adjust a magnitude of the resonant frequency of the antenna resonant circuit via adjustment of a capacitance of a capacitor, adjustment of the magnitude of the resonant frequency operative to reduce the temperature of the chip.

9. The circuit as in claim 8, wherein the controller circuit is operative to adjust a setting of the resonant frequency of the antenna resonant circuit, adjustment of the setting of the resonant frequency operative to reduce a temperature of the antenna resonant circuit.

10. The circuit as in claim 7, wherein the chip is powered via energy received from the NFC-enabled device communicating near field communications to the antenna.

11. The circuit as in claim 1, wherein the controller circuit is operative to adjust a magnitude of the resonant frequency of the antenna resonant circuit, adjustment of the magnitude of the resonant frequency operative to reduce a magnitude of the temperature monitored by the temperature sensor.

12. The circuit as in claim 11, wherein the controller circuit is operative to communicate data from the antenna to the NFC-enabled device via the near field communications.

13. The circuit as in claim 1, wherein the controller circuit is operative to decrease the magnitude of the resonant frequency in response to detecting that the temperature is less than the reference temperature value, the controller circuit operative to decrease the resonant frequency until the carrier frequency lies in a central region of the resonance peak of the antenna resonant circuit.

14. The circuit as in claim 13, wherein the controller circuit is operative to communicate data from the antenna to the NFC-enabled device via the near field communications.

15. The circuit as in claim 1, wherein the antenna resonant circuit includes an adjustable capacitor, a combination of the inductance of the antenna and a capacitance of the capacitor defining the resonant frequency of the antenna resonant circuit; and wherein the controller circuit is operative to adjust the capacitance of the antenna resonant circuit, the adjustment of the capacitance changing the resonant frequency of the antenna resonant circuit.

16. The circuit as in claim 15, wherein the adjustment of the capacitance reduces a temperature sensed by the temperature sensor signal.

17. The circuit as in claim 1, wherein the controller circuit is operative to adjust the magnitude of the resonant frequency to be nearer in magnitude to the carrier frequency of wireless signals from the NFC-enabled device in response to detecting that the temperature sensed by the temperature sensor is below the reference temperature value; and wherein the controller circuit is operative to adjust the magnitude of the resonant frequency to be further away from the carrier frequency of wireless signals from the NFC-enabled device in response to detecting that the temperature sensed by the temperature sensor is above the reference temperature value.

18. The circuit as in claim 1, wherein the controller circuit is operative to adjust the magnitude of the resonant frequency with respect to the carrier frequency of wireless signals transmitted by the NFC-enabled device depending on the temperature as indicated by the temperature sensor signal.

19. The circuit as in claim 1, wherein the controller circuit is operative to wirelessly communicate the temperature as indicated by the temperature signal to the NFC-enabled device.

20. A method comprising:
measuring a temperature of a chip via a temperature sensor signal received from a temperature sensor monitoring the temperature of the chip;
varying a resonant frequency of an antenna resonant circuit, the antenna resonant circuit comprising an antenna that is coupled to an NFC reader/writer disposed in the chip; and
wherein varying the resonant frequency includes: changing the resonant frequency to be different than a carrier frequency used by an NFC-enabled device to communicate with the antenna; and
the method further comprising: calculating a difference between the temperature as indicated by the temperature sensor signal and a reference temperature value;
increasing a magnitude of the resonant frequency in response to detecting that the temperature is greater than the reference temperature value, the magnitude of the resonant frequency being increased until the carrier frequency used by the NFC-enabled device no longer lies within a resonance peak of the antenna resonant circuit.

21. The method as claimed in claim 20, wherein varying the resonant frequency comprises:
adjusting a capacitance of a capacitor disposed in the antenna resonant circuit.

22. The method as in claim 20, wherein varying the resonant frequency includes:
adjusting a capacitance of the antenna resonant circuit.

23. The method as in claim 22 further comprising:
generating a supply voltage based on an RF signal received by the antenna.

24. The method in claim 23, wherein the NFC reader/writer supports the near field communications.

25. The method in claim 20 further comprising: varying the resonance frequency of the antenna resonant circuit based on the temperature of the chip.

26. The method in claim 25 further comprising: transferring, via an RF front end and the antenna, processed sensor signals to the NFC-enabled device.

* * * * *